J. A. BYRD.
Plow.
No. 28,064. Patented May 1. 1860.
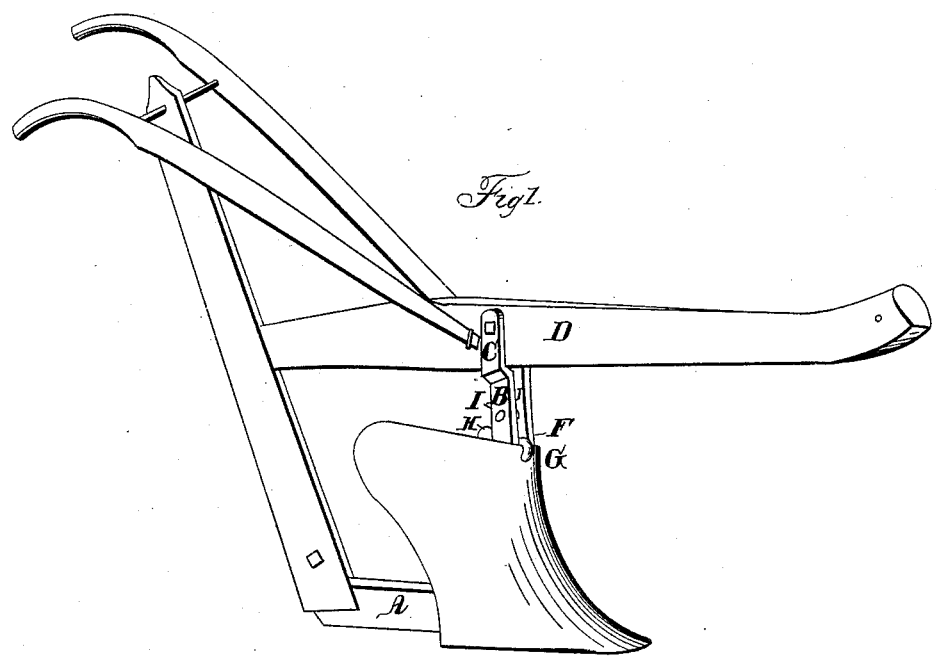
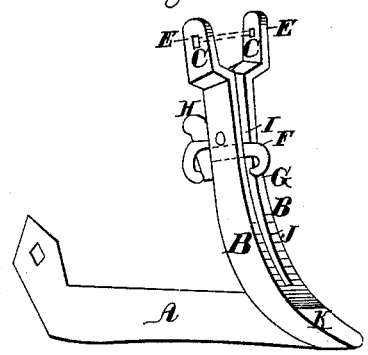
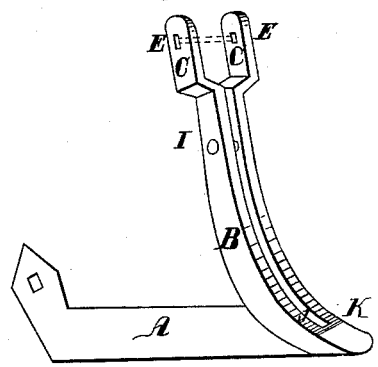
Witnesses:
John W. Power
Oliver Rostron
Inventor:
John A. Byrd

UNITED STATES PATENT OFFICE.

JOHN A. BYRD, OF JACKSON COUNTY, FLORIDA.

IMPROVEMENT IN PLOW-STOCKS.

Specification forming part of Letters Patent No. 28,064, dated May 1, 1860.

*To all whom it may concern:*

Be it known that I, JOHN A. BYRD, of Jackson county, in the State of Florida, have invented a new and useful Improvement in Plow-Stocks and Ways of Fastening Different Kinds of Plows to the Same; and I do hereby declare that the following is a full and exact description thereof, reference being had to the accompanying drawings, and to the letters of reference marked thereon.

Figure 1 is a perspective view of the plow complete. Figs. 2 and 3 are sections showing the stock and foot detached from the beam.

To enable others skilled in the art to make and use my invention, I will proceed to describe its construction.

I make the base or landside of a bar of iron two inches wide, half an inch thick, and twelve inches long, shaped as shown at A in the accompanying drawings. I make the stock B of two pieces of iron one and a half inch wide, three-eighths of an inch thick, and about eighteen inches long, and bend them so as to form a square collar, C, for the wooden beam D to pass through. I then punch a square hole in one and a round hole in the other. A bolt, E, passing through these holes and the beam D, makes them fast. I pass a bolt through them about four inches below the beam, riveted fast, so as to leave a space, J, of half an inch between them. I then shape and crook them as shown in the drawings. I then place the bar A between their points and weld them fast together—in some instances as seen in Fig. 3—so as to let the space between these bars extend nearly to the point, as shown. I make the hook F for fastening on the plows to the stock of iron half an inch square, with a head riveted or welded on one end, shaped so as to keep the staple-wedge to its place, as shown. The other end I bend so as to form the hook F, which, passing between the bars, fits in a notch in the upper end of the plow and a depression made for the purpose, as seen at G. I make my staple-wedge to fit and drive down between the head of the hook and bars composing the stock, as shown at H.

K, Fig. 3, is a depression formed on the front of the stock to receive a corresponding projection on the plow, thereby securing it firmly in place.

What I claim as my invention, and desire to secure by Letters Patent, is—

The arrangement of the bars A and B B, collar C, bolts E and I, hook F, wedge H, and depressions G and K, as described, for the purposes set forth.

JOHN A. BYRD.

Witnesses:
JOHN W. POOSER,
OLIVER ROSTRUM.